United States Patent
Liu et al.

(10) Patent No.: US 11,237,132 B2
(45) Date of Patent: Feb. 1, 2022

(54) TRACKING AND ESTIMATING TUBING FATIGUE IN CYCLES TO FAILURE CONSIDERING NON-DESTRUCTIVE EVALUATION OF TUBING DEFECTS

(71) Applicant: SCHLUMBERGER TECHNOLOGY CORPORATION, Sugar Land, TX (US)

(72) Inventors: Zhanke Liu, Sugar Land, TX (US); Linyuan Yang, Sugar Land, TX (US); Gregory Campbell, Katy, TX (US); Rujuta Marathe, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/086,155

(22) PCT Filed: Mar. 16, 2017

(86) PCT No.: PCT/US2017/022620
§ 371 (c)(1),
(2) Date: Sep. 18, 2018

(87) PCT Pub. No.: WO2017/161064
PCT Pub. Date: Sep. 21, 2017

(65) Prior Publication Data
US 2019/0064116 A1 Feb. 28, 2019

Related U.S. Application Data

(60) Provisional application No. 62/310,427, filed on Mar. 18, 2016.

(51) Int. Cl.
*G01N 27/82* (2006.01)
*G01N 27/83* (2006.01)
*E21B 47/092* (2012.01)

(52) U.S. Cl.
CPC ............ *G01N 27/83* (2013.01); *G01N 27/82* (2013.01); *E21B 47/092* (2020.05)

(58) Field of Classification Search
CPC ..... G01N 27/83; G01N 27/82; E21B 47/0905
See application file for complete search history.

(56) References Cited

U.S. PATENT DOCUMENTS

| | | |
|---|---|---|
| 3,940,689 A | 2/1976 | Johnson, Jr. |
| 4,636,727 A | 1/1987 | Kahil et al. |

(Continued)

FOREIGN PATENT DOCUMENTS

| | | |
|---|---|---|
| EP | 2725352 A1 | 4/2014 |
| JP | H09-318586 A | 12/1997 |

(Continued)

OTHER PUBLICATIONS

International Search Report issued in International Patent Application No. PCT/US2015/065202 dated Feb. 26, 2016; 14 pages.

(Continued)

*Primary Examiner* — G. M. A Hyder
(74) *Attorney, Agent, or Firm* — Michael L. Flynn

(57) ABSTRACT

A technique facilitates tracking and assessing a fatigue life of a tubing string utilizing, for example, estimation of cycles to failure when used in a wellbore operation. The technique may comprise initially determining a fatigue life of a tubing string. Additionally, the technique comprises utilizing a sensing device, e.g. a magnetic flux leakage (MFL) device, to monitor the tubing string. When an anomaly, e.g. a new defect, is detected by the sensing device, a new fatigue life of the tubing string is determined based on the change. The new fatigue life may be used to estimate a fatigue life in terms of cycles to failure.

19 Claims, 7 Drawing Sheets

(56) References Cited

U.S. PATENT DOCUMENTS

| | | | |
|---|---|---|---|
| 4,675,604 A | 6/1987 | Moyer et al. | |
| 4,704,580 A | 11/1987 | Moake et al. | |
| 5,090,039 A | 2/1992 | Gard et al. | |
| 5,303,592 A | 4/1994 | Livingston | |
| 5,323,856 A | 6/1994 | Davis et al. | |
| 5,461,313 A | 10/1995 | Bohon et al. | |
| 5,581,037 A | 12/1996 | Kwun et al. | |
| 5,793,200 A | 8/1998 | Berrill | |
| 5,826,654 A | 10/1998 | Adnan et al. | |
| 5,914,596 A | 6/1999 | Weinbaum | |
| 6,023,986 A | 2/2000 | Smith et al. | |
| 6,205,869 B1 | 3/2001 | Schadt et al. | |
| 6,241,028 B1 | 6/2001 | Bijleveld et al. | |
| 6,316,937 B1 | 11/2001 | Edens | |
| 6,321,596 B1 | 11/2001 | Newman | |
| 6,404,189 B2 | 6/2002 | Kwun et al. | |
| 6,820,653 B1 | 11/2004 | Schempf et al. | |
| 6,967,478 B2 | 11/2005 | Wayman et al. | |
| 7,163,055 B2 | 1/2007 | Coon et al. | |
| 7,347,261 B2 | 3/2008 | Markel et al. | |
| 7,357,179 B2 | 4/2008 | Zheng et al. | |
| 7,414,395 B2 | 8/2008 | Gao et al. | |
| 7,571,054 B2 | 8/2009 | Newman | |
| 7,783,432 B2 | 8/2010 | Orth et al. | |
| 8,049,494 B2 | 11/2011 | Lepage et al. | |
| 8,086,425 B2 | 12/2011 | Papadimitriou et al. | |
| 8,428,910 B2 | 4/2013 | Papadimitriou et al. | |
| 8,542,127 B1 | 9/2013 | Goroshevskiy et al. | |
| 9,176,096 B2 | 11/2015 | Goroshevskiy et al. | |
| 9,322,805 B2 | 4/2016 | Koka et al. | |
| 9,581,567 B2 | 2/2017 | Goroshevskiy et al. | |
| 9,671,371 B2 | 6/2017 | Liu et al. | |
| 9,964,519 B2 | 5/2018 | Goroshevskiy et al. | |
| 10,247,657 B2 | 4/2019 | Allen et al. | |
| 10,288,583 B2 | 5/2019 | Chang et al. | |
| 10,317,331 B2 | 6/2019 | Guner et al. | |
| 10,330,641 B2 | 6/2019 | Goroshevskiy et al. | |
| 2001/0017541 A1 | 8/2001 | Kwun et al. | |
| 2001/0022514 A1 | 9/2001 | Light et al. | |
| 2001/0029989 A1 | 10/2001 | Paz | |
| 2003/0052670 A1 | 3/2003 | Miszewski | |
| 2003/0098697 A1 | 5/2003 | Tanaka | |
| 2003/0118230 A1 | 6/2003 | Song et al. | |
| 2003/0155415 A1 | 8/2003 | Markham et al. | |
| 2003/0164053 A1 | 9/2003 | Ignagni | |
| 2003/0173072 A1 | 9/2003 | Vinegar et al. | |
| 2004/0095137 A1 | 5/2004 | Kwun et al. | |
| 2004/0103121 A1 | 5/2004 | Johnson et al. | |
| 2004/0205727 A1 | 10/2004 | Sit et al. | |
| 2004/0216512 A1 | 11/2004 | Kwun et al. | |
| 2005/0046591 A1 | 3/2005 | Pacault et al. | |
| 2005/0242169 A1 | 11/2005 | Michal | |
| 2006/0055584 A1 | 3/2006 | Waite et al. | |
| 2006/0096753 A1 | 5/2006 | Zheng et al. | |
| 2006/0184714 A1 | 8/2006 | Dang et al. | |
| 2006/0202685 A1 | 9/2006 | Barolak et al. | |
| 2006/0202686 A1 | 9/2006 | Barolak et al. | |
| 2006/0247868 A1 | 11/2006 | Brandstrom | |
| 2006/0254373 A1 | 11/2006 | Boudreaux | |
| 2007/0150084 A1 | 6/2007 | Grubb et al. | |
| 2007/0222436 A1 | 9/2007 | Gao et al. | |
| 2007/0222438 A1 | 9/2007 | Reeves | |
| 2008/0035334 A1 | 2/2008 | Newman | |
| 2008/0106260 A1 | 5/2008 | Rogers | |
| 2008/0228412 A1 | 9/2008 | Orth et al. | |
| 2009/0229362 A1 | 9/2009 | Tomar et al. | |
| 2009/0243604 A1 | 10/2009 | Dutta et al. | |
| 2010/0131209 A1 | 5/2010 | Pacelli | |
| 2010/0131450 A1 | 5/2010 | Nguyen et al. | |
| 2011/0191045 A1 | 8/2011 | Boenisch | |
| 2012/0130651 A1 | 5/2012 | Papadimitriou et al. | |
| 2013/0057269 A1 | 3/2013 | Koka et al. | |
| 2013/0060487 A1 | 3/2013 | Papadimitriou et al. | |
| 2013/0124109 A1 | 5/2013 | Denenberg et al. | |
| 2014/0088889 A1 | 3/2014 | Duckworth | |
| 2014/0107947 A1 | 4/2014 | Papadimitriou et al. | |
| 2014/0200831 A1 | 7/2014 | Smith et al. | |
| 2014/0207390 A1* | 7/2014 | Zheng | E21B 19/22 702/34 |
| 2014/0327443 A1 | 11/2014 | Liu et al. | |
| 2014/0368191 A1 | 12/2014 | Goroshevskiy et al. | |
| 2015/0061659 A1 | 3/2015 | Freear et al. | |
| 2015/0377012 A1 | 12/2015 | Liu et al. | |
| 2016/0231278 A1 | 8/2016 | Goroshevskiy et al. | |
| 2016/0231279 A1 | 8/2016 | Hoyt | |
| 2016/0231280 A1 | 8/2016 | Zwanenburg et al. | |
| 2016/0252422 A1 | 9/2016 | Howitt | |
| 2016/0252481 A1* | 9/2016 | Zheng | G01M 3/40 324/238 |
| 2017/0030850 A1 | 2/2017 | Castaneda-Lopez et al. | |
| 2017/0122309 A1 | 5/2017 | Kusumba et al. | |
| 2017/0122909 A1 | 5/2017 | Goroshevskiy et al. | |
| 2017/0241953 A1 | 8/2017 | Kagawa | |
| 2017/0261469 A1 | 9/2017 | Chang et al. | |
| 2017/0322182 A1 | 11/2017 | Zheng et al. | |
| 2017/0350864 A1 | 12/2017 | Goroshevskiy et al. | |
| 2017/0372704 A1 | 12/2017 | Papadimitriou et al. | |
| 2018/0106762 A1 | 4/2018 | Boenisch | |
| 2018/0149552 A1 | 5/2018 | Wayman et al. | |
| 2018/0188207 A1 | 7/2018 | Freear et al. | |
| 2018/0196005 A1 | 7/2018 | Fanini et al. | |
| 2018/0266992 A1 | 9/2018 | Liu et al. | |
| 2018/0321133 A1 | 11/2018 | Allen et al. | |
| 2018/0356365 A1 | 12/2018 | Liu et al. | |
| 2019/0056355 A1 | 2/2019 | Amineh et al. | |
| 2019/0072522 A1 | 3/2019 | Desjardins | |
| 2019/0145931 A1 | 5/2019 | Feng et al. | |
| 2019/0145932 A1 | 5/2019 | Feng et al. | |
| 2019/0145933 A1 | 5/2019 | Feng et al. | |
| 2020/0208769 A1 | 7/2020 | Du | |

FOREIGN PATENT DOCUMENTS

| | | |
|---|---|---|
| JP | H11-83842 A | 3/1999 |
| JP | 2744942 B2 | 5/2019 |
| RU | 2097649 C1 | 11/1997 |
| RU | 2102738 C1 | 1/1998 |
| RU | 2149254 C1 | 5/2000 |
| WO | 1998016842 A1 | 4/1998 |
| WO | 1999040724 A1 | 8/1999 |
| WO | 2003058545 A1 | 7/2003 |
| WO | 2012103541 A1 | 8/2012 |
| WO | 2012174057 A1 | 12/2012 |
| WO | 2014018844 A1 | 1/2014 |
| WO | 2015051225 A1 | 4/2015 |
| WO | 2015187923 A1 | 12/2015 |
| WO | 2016094775 A1 | 6/2016 |
| WO | 2017100387 A1 | 6/2017 |

OTHER PUBLICATIONS

Christian et al., "Statistical Analysis of Coiled Tubing Fatigue Data", SPE 121457-MS, Presented at the SPE/ICoTA Coiled Tubing and Well Intervention Conference and Exhibition, The Woodlands, Texas, USA, Mar. 31-Apr. 1, 2009, 7 pages.

Newman, K. R., "Coiled Tubing Life Modeling," SPE 22820, SPE Annual Technical Conference and Exhibition, Dallas, Texas, Oct. 6-9, 1991, 7 pages.

Burgos, R., Mattos, R. F. and Bulloch, S., "Delivering Value for Tracking Coiled Tubing Failure Statistics," SPE 107098 8 pages.

Rosen, P. M. A., "Remote Coiled Tubing Operation Monitoring", SPE 46038, 1998 SPE/ICoTA Coiled Tubing Roundtable, Houston, Texas Apr. 15-16, 1998, 7 pages.

Stanley, R. K., "Results of a New Coiled Tubing Assessment Tool," SPE 141944, 2011 SPE/ICoTA Coiled Tubing and Well Intervention Conference and Exhibition, The Woodlands, Texas, Apr. 5-6, 2011, 8 pages.

Zheng, A., Liu, Z., Zwanenburg, M., Burgos, R., Scuadroni, N., Stayer, A., "State of the Art Portable Measurement and Defect Detection Technology for Coiled Tubing," SPE 163945, 2013 SPE/ICoTA Coiled Tubing and Well Intervention Conference & Exhibition, The Woodlands, Texas, Mar. 26-27, 2013, 8 pages.

(56) References Cited

OTHER PUBLICATIONS

Z. Liu, G. Minerbo, and A. Zheng, "Steel coiled tubing defect evaluation using magnetic flux leakage signals", SPE 168260, Coiled Tubing & Well Intervention Conference & Exhibition (ICoTA), The Woodlands, TX, Mar. 25-26, 2014, 16 pages.

University of Tulsa, CTMRC 2011-2012 Annual Project Review, Sep. 28, 2012, 49 pages.

Padron, T, Luft. B., Kee, E., Tipton, S., "Fatigue Life of Coiled Tubing with External Mechanical Damage," SPE 107113, 2007 SPE/ICoTA Coiled Tubing and Well Intervention Conference and Exhibition, The Woodlands, Texas, Mar. 20-21, 2007, 16 pages.

Lynch, "Magnetic Flux Leakage Robotic Pipe Inspection: Internal and External Methods", Rice University, A Thesis Submitted in Partial Fulfillment of the Requirements for the Degree Master of Science, Houston, Texas, Dec. 2009, 66 pages.

Tipton, S. M., "Coiled Tubing Deformation Mechanics: Diametral Growth and Elongation", SPE 36336, ICoTA/SPE North American Coiled Tubing Roundtable, Feb. 26-28, 1996, 9 pages.

Tipton et al.., "Fatigue Integrity Analysis of Rotating Coiled Tubing", SPE 100068. 2006 SPE/ICoTA Coiled Tubing and Well Intervention Conference and Exhibition, the Woodlands, TX, USA, Apr. 4-5, 2006, 8 pages.

Stanley, R. K, "New Results from Electromagnetic and Ultrasound Inspection of Coiled Tubulars", SPE 121810, SPE/ICoTA Coiled Tubing and Well Intervention Conference and Exhibition, Mar. 31-Apr. 1, 2009, 8 pages.

International Search Report and Written Opinion issued in International Patent Appl. No. PCT/US2016/065495 dated Mar. 29, 2017; 16 pages.

International Search Report and Written Opinion issued in International Patent Appl. No. PCT/US2017/022620 dated Jun. 12, 2017; 12 pages.

Jiang, Q., Experimental Study of Interference Factors and Simulation on Oil-Gas Pipeline Magnetic Flux Leakage Density Signal, Proceedings of the 2007 IEEE International Conference on Mechatronics and Automation, Harbin, China, 2007, pp. 3652-3656.

Xu, L.Y., "Reliability and failure pressure prediction of various grades of pipeline steel in the presence of corrosion defects and pre-strain", International Journal of Pressure Vessels and Piping, 89, 2012, pp. 75-84.

Notice of Allowance received in U.S. Appl. No. 15/027,124 dated Feb. 10, 2021, 14 pages.

Office Action received in U.S. Appl. No. 15/534,709 dated Jul. 19, 2021, 18 pages.

* cited by examiner

TRACKING AND ESTIMATING TUBING FATIGUE IN CYCLES TO FAILURE CONSIDERING NON-DESTRUCTIVE EVALUATION OF TUBING DEFECTS

CROSS-REFERENCE TO RELATED APPLICATION

The present document is based on and claims priority to U.S. Provisional Application Ser. No. 62/310,427, filed Mar. 18, 2016, which is incorporated herein by reference in its entirety.

BACKGROUND

Coiled tubing technology has been used in an expanding range of applications since its introduction to the oil industry in the 1960s. The wide array of tools and technologies that can be used in cooperation with coiled tubing and the ability of coiled tubing to pass through completion tubulars makes the technology very versatile. A coiled tubing system may include surface pumping facilities, a coiled tubing string mounted on a reel, an injector head or other mechanism to convey the coiled tubing into and out of the wellbore, and a surface control apparatus at the wellhead. The coiled tubing may be deployed in wellbores to facilitate performance of well treatment and/or well intervention operations, e.g. operations comprising hydraulic fracturing, matrix acidizing, milling, perforating, coiled tubing drilling, or other downhole operations.

SUMMARY

In general, the present disclosure provides a methodology and system for tracking and assessing a fatigue life of a tubing string utilizing, for example, estimation of cycles to failure when used in a wellbore operation. According to an embodiment, the technique comprises determining a fatigue life of a tubing string, e.g. a coiled tubing string, and utilizing a sensing device, e.g. a magnetic flux leakage (MFL) device, to monitor the tubing string. When an anomaly, e.g. a new defect, is detected by the sensing device, a new fatigue life of the tubing string is determined based on the anomaly. The new fatigue life may be used to estimate a fatigue life in terms of cycles to failure.

BRIEF DESCRIPTION OF THE DRAWINGS

Certain embodiments will hereafter be described with reference to the accompanying drawings, wherein like reference numerals denote like elements. It should be understood, however, that the accompanying figures illustrate various implementations described herein and are not meant to limit the scope of various technologies described herein, and.

DETAILED DESCRIPTION

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a methodology and system for tracking and assessing a fatigue life of a pipe string, e.g. a coiled tubing string. According to an embodiment, the technique may be used to provide accurate estimation of cycles to failure, e.g. trips downhole until failure, when the pipe string is used in, for example, a wellbore operation. The technique comprises determining a fatigue life of a coiled tubing string based on historical data which may be stored on a processing device, e.g. a computer, or other suitable device. A sensing device, e.g. a magnetic flux leakage (MFL) device, also is used to monitor the coiled tubing string. When an anomaly, e.g. a new defect, is detected by the sensing device, a new fatigue life of the coiled string is determined based on stored data regarding the anomaly. Data on fatigue life, anomaly type, and updated fatigue life may be processed to determine an accurate estimate of fatigue life in cycles and/or trips to failure. The estimate information may then be output to enable evaluation regarding future use of the pipe string.

Accordingly, embodiments described herein may be used as a method of tracking coiled tubing fatigue with incorporation of the concept of cycles to failure. This new approach to fatigue tracking provides more direct assessment to end users regarding the fitness of the coiled tubing string for service as compared to traditional methods of percentage fatigue life tracking. Embodiments utilize sensor data, e.g. MFL inspection data, to estimate a reduction in cycles to failure due to anomalies, such as changes which occur to the tubing string. Examples of anomalies which can affect the number of cycles to failure include localized defects, wall thinning, ballooning, and a variety of other anomalies.

Figure 1:
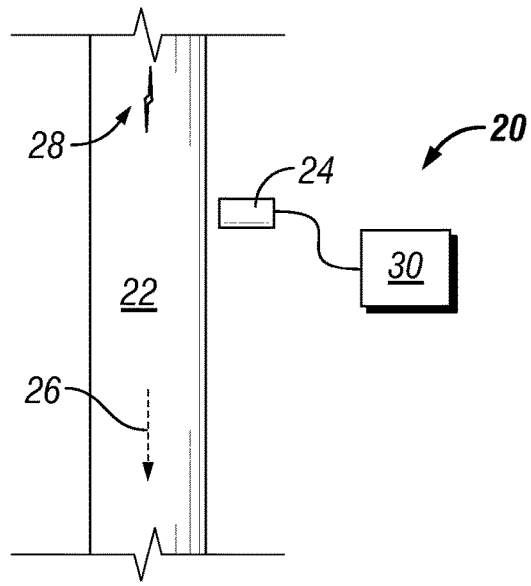
FIG. 1 is a schematic illustration of an example of a pipe defect assessment system for evaluating pipe, e.g. coiled tubing, according to an embodiment of the disclosure.

Referring generally to FIG. 1, an example of a pipe tracking system 20 for evaluating pipe 22, e.g. jointed pipe or coiled tubing, is illustrated. It should be noted that the embodiments described herein may be employed in well or non-well related applications. Additionally, the pipe tracking system 20 may comprise a variety of pipe support systems, pipe delivery systems, sensor arrangements, local and/or remote processing systems, data evaluation algorithms, models, and/or other software programs, as well as other components arranged in various configurations depending on the parameters of a pipe damage assessment application.

In FIG. 1, an embodiment of the pipe tracking system 20 is in the form of a coiled tubing tracking system. Additionally, the pipe 22 is illustrated in the form of coiled tubing 22 which moves relative to an appropriate sensor device having a sensor or sensors 24. In embodiments described herein, the sensor or sensors 24 may comprise magnetic flux leakage (MFL) sensors which monitor magnetic flux leakage. The relative movement of coiled tubing 22 is indicated by arrow 26, however some embodiments may be constructed to move the sensor or sensors 24 along a stationary pipe 22. Additionally, both the pipe 22 and the sensor(s) 24 may be moved to cause the relative movement with respect to each other.

Each sensor 24 may be positioned to monitor for the presence of a magnetic flux leakage signal associated with an anomaly 28, e.g. a defect, and to output sensor data to a data processing system 30. The signals provided by sensor 24 change upon detection of the differing magnetic flux leakage signal associated with the defect 28 or other anomaly. The changes in that sensor data can be processed via data processing system 30 to, for example, quantify defect shape, size, and/or severity which can then be used in combination with other data to estimate a fatigue life, e.g. a cycles to failure, with respect to the coiled tubing or other pipe 22.

The presence of an anomaly on coiled tubing 22 affects its mechanical integrity by, for example, reducing its tensile load capacity or reducing its pressure containment capacity, thus reducing the number of cycles until failure of the coiled tubing occurs. The cycles to failure may be diminished because the presence of a defect often acts as a stress riser which can lead to development of fatigue cracking in coiled tubing or other pipe. However, changes in wall thickness, ballooning, or other anomalies also can reduce the cycles to failure relative to the determined fatigue life of the coiled tubing without the presence of the anomaly or anomalies.

By utilizing the sensor or sensors 24, magnetic flux leakage changes may be monitored to determine whether the magnetic flux leakage signal, e.g. MFL signature, begins to indicate characteristics associated with an anomaly able to reduce the cycles to failure. The magnetic flux leakage signal data is relayed from the sensor 24 to the data processing system 30 for evaluation, as described in greater detail below. The sensor(s) 24 may be used at a wellsite or at an off-site facility for testing pipe 22. For example, the sensor(s) 24 may be used in a wellbore operation as coiled tubing 22 is deployed into or retrieved from a wellbore penetrating a subterranean formation.

In the example illustrated, the sensor or sensors 24 detect magnetic flux leakage but the sensors 24 may be combined with other types of sensors positioned to help detect and analyze an anomaly or anomalies along pipe 22. In some embodiments sensor 24 may comprise a single sensor but sensor 24 also may comprise a plurality of sensors or sensor elements arranged longitudinally and/or circumferentially. In a specific embodiment, sensor 24 comprises a plurality of magnetic flux leakage sensing elements positioned to detect along the circumference of pipe 22 as pipe 22 and sensor(s) 24 are moved relative to each other. Although pipe 22 has been described in the form of coiled tubing which moves relative to the sensor, the pipe 22 may comprise individual pipe joints or other types of pipes which are moved relative to the sensor 24.

Data obtained by the sensor or sensors 24 is transmitted to processing system 30. The processing system 30 may be located in whole or in part at a well site, at a well testing facility, and/or at a remote location. After processing data from each sensor 24, the processing system 30 may be used to display or otherwise output results related to the detection and evaluation of magnetic flux leakage signal data corresponding with the one or more anomalies 28. The raw and/or processed data may be sent to other systems and other locations for continued processing, analysis, and/or control operations.

Figure 2:
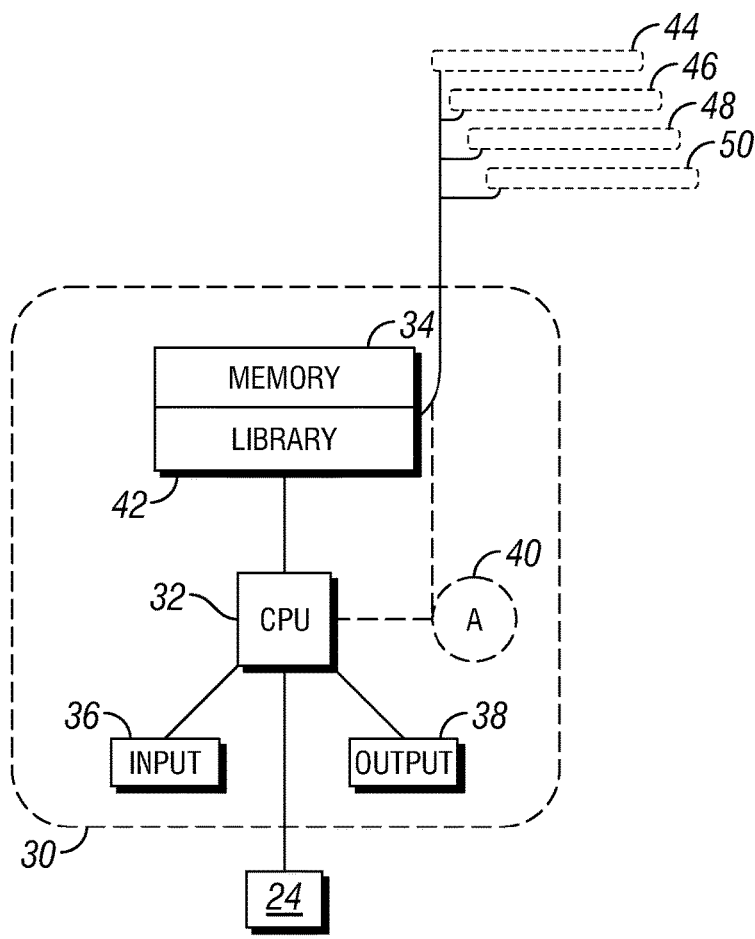
FIG. 2 is a schematic illustration of a processor-based system for evaluating sensor data in combination with stored historical data, thus enabling accurate estimation of cycles to failure, according to an embodiment of the disclosure.

Referring generally to FIG. 2, an example of processing system 30 is illustrated. In this example, processing system 30 is in the form of a computer-based system having a processor 32, such as a central processing unit (CPU). The processor 32 is coupled with sensor or sensors 24 and is operatively employed to intake magnetic flux leakage signal data related to anomalies, e.g. defects, 28 and then to process the data, e.g. run appropriate models and/or algorithms. For example, the data may be processed to find similar stored signal data correlated with specific types of defects 28, e.g. defects of a certain size, type, and/or shape. This data may then be processed to update stored data on fatigue life of the pipe/coiled tubing 22 so as to enable an accurate estimation of cycles to failure.

Fatigue life data, anomaly data, and other types of data may be stored in a suitable memory 34 which may comprise a single or plural memory devices. In the example illustrated, the processor 32 is operatively coupled with memory 34 as well as with an input device 36 and an output device 38. In some embodiments, the connection between sensors 24 and processing system 30 may be indirect. For example, data from the sensor or sensors 24 may be collected and subsequently downloaded to processing system 30.

Desired data may be stored in memory 34 and the processor 32 may be used to run selected algorithms/models, e.g. comparisons with stored correlations, via a software module/system 40, e.g. an answer product software module. For example, the software module 40 may be used to process the data collected by sensor(s) 24 in combination with other data stored in memory 34. The memory 34 may comprise a library 42 used to store a variety of data. The library 42 also may be used to store sensor data obtained via the one or more sensors 24.

By way of example, the library 42 may comprise a fatigue life library 44 which comprises, for example, historical data on fatigue life for various types of coiled tubing 22 (or other types of pipe), and fatigue life models and associated parameters calibrated against historical fatigue data, without including detrimental effects due to defect 28. The library 42 also may comprise an anomaly library 46 which contains historical data on many types of anomalies which can affect the fatigue life of the pipe/coiled tubing 22. According to an embodiment, the anomaly library 46 may include a pre-established benchmark or defect library for use by processor 32. For example, data on the defects 28 may be stored in anomaly library 46 as well as selected attributes of given defects, e.g. a defect photo and a corresponding magnetic flux leakage signal or "defect signature" representing a specific type of defect 28.

The library 42 also may comprise a correlation library 48 containing, for example, historical data regarding correlations related to fatigue life with and without a given anomaly/defect 28. The software module 40 is able to use such correlations to determine a new fatigue life upon the occurrence of a given defect or other anomaly 28 which matches stored data in library 42 regarding that type of defect/anomaly. Additionally, the library 42 may comprise a cycles to failure library 50 which contains data based on historical testing. As described in greater detail below, testing is employed to obtain data on remaining pipe/coiled tubing cycles based on, for example, the new fatigue life combined with the type of operation in which the pipe/coiled tubing 22 is utilized.

Figure 3:
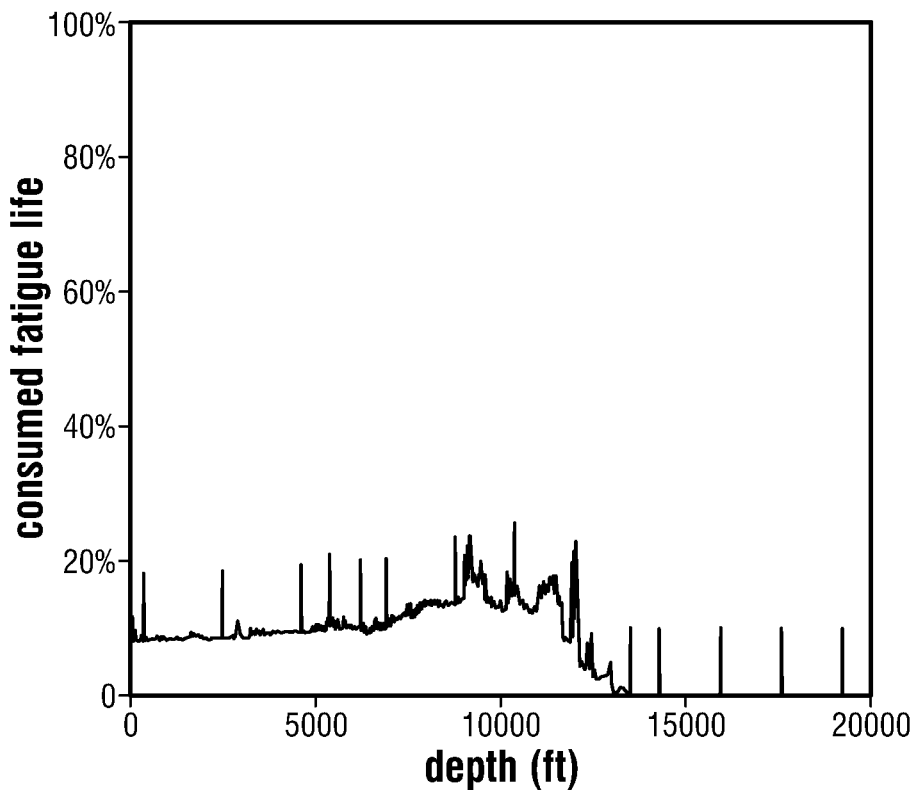
FIG. 3 is a graphical representation illustrating data regarding fatigue life of a pipe versus depth of the pipe, according to an embodiment of the disclosure.

Referring generally to FIG. 3, a graphical illustration is provided in which a plot of data representing consumed fatigue life of coiled tubing 22 is illustrated versus depth of the coiled tubing 22 as measured from a downhole end of the coiled tubing. This type of data may be stored in, for example, fatigue life library 44. Based on the profile of percentage consumed fatigue life in this example, the coiled tubing 22 appears to be most heavily used (the highest percentage of consumed fatigue life) at a depth interval of around 10,000 feet. However, the percentage fatigue life plot, alone, may not provide end users with sufficient information regarding the expected number of cycles to failure under anticipated operating conditions.

Additionally, due to model nonlinearity of, for example, the fatigue life library 44, the fatigue life value may not indicate the percentage of remaining cycles to failure. For example, a fatigue life of 50% may not mean the remaining number of cycles is the same number as the consumed number of cycles. Due to model nonlinearity, the remaining number of cycles to reach 100% fatigue life may be a fraction of the consumed number of cycles to reach the fatigue life of 50%. If the coiled tubing 22 is a tapered coiled tubing string, the same level of percentage fatigue life on sections of different wall thicknesses may not be equivalent. For example, 40% consumed fatigue life on a thin wall, e.g. a wall of 0.125 inch thickness, may be more serious than 60% consumed fatigue life on a thicker wall, e.g. a wall of 0.204 inch thickness. Moreover, a fatigue life tracking model relying solely on historical data regarding consumed fatigue life for a given coiled tubing 22 may not be sufficiently accurate in the presence of anomalies, e.g. localized defects 28. It should be noted the examples and specific values provided herein are given for purposes of explanation and should not be construed as limiting.

Figure 4:
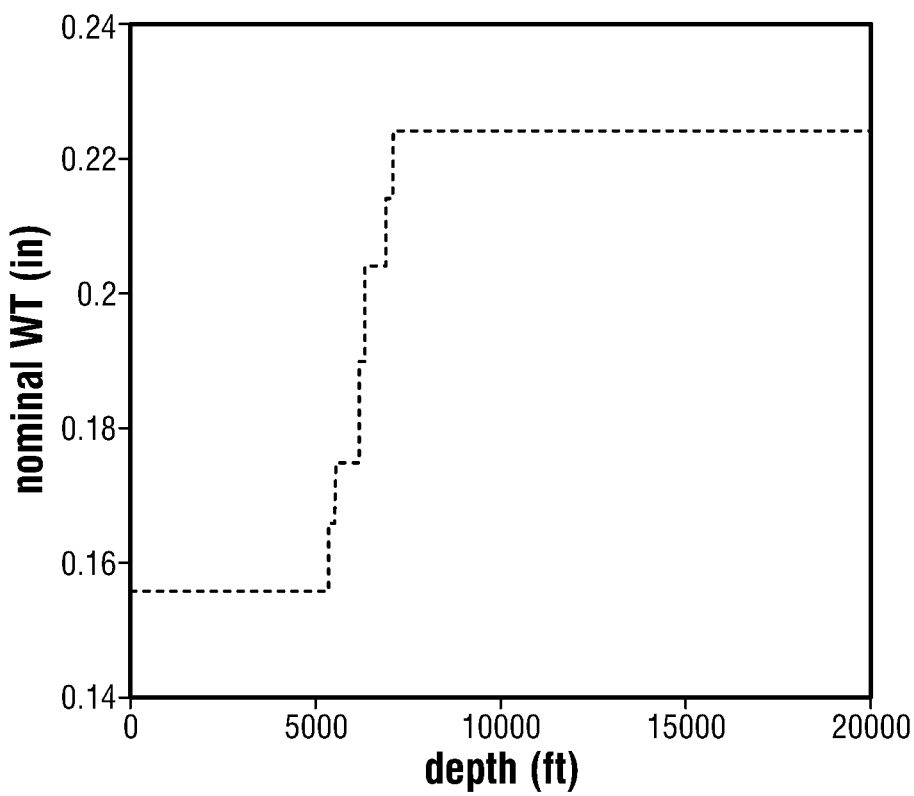
FIG. 4 is a graphical representation illustrating data regarding nominal wall thickness of a pipe versus depth of the pipe, according to an embodiment of the disclosure.

Embodiments described herein combine fatigue life data with additional data to provide end users with improved information regarding the number of cycles to failure. The methodology is useful for a variety of tubing, including tapered coiled tubing. Tapered coiled tubing strings are widely used in coiled tubing operations and feature changes in nominal wall thickness values from a downhole end of the coiled tubing 22 to an uphole end of the coiled tubing 22. An example of a coiled tubing wall thickness profile is illustrated in FIG. 4 as plotted against depth from a downhole end of the coiled tubing. In this example, the coiled tubing 22 has a plurality of different wall thicknesses, e.g. seven different wall thickness values, and a 20,000 foot span. As illustrated, the wall thickness may transition from 0.156 inches at a downhole end to 0.204 inches at an uphole end within the depth range of approximately 5500 feet to 6500 feet.

For tapered coiled tubing such as the example illustrated in FIG. 4, the baseline consumed fatigue life often is traditionally considered 0% for the entire string when in a new, unused state from the manufacturer. This traditional baseline consumed fatigue life of 0% is determined despite the differences in tubing wall thickness at different depths along the borehole during a coiled tubing operation. Despite the change in wall thickness values in this scenario, the expected remaining fatigue life to be consumed is considered the same, namely 100%, for the entire coiled tubing 22. However, the actual expected number of cycles to failure may vary substantially between the sections of different wall thicknesses. For example, the thicker walled end of the coiled tubing 22 would tend to last many more cycles than the thin walled end under typical operating conditions. This also illustrates the desirability of cycles to failure modeling which provides more direct information to end users compared to the conventional percentage fatigue life modeling.

Figure 5:
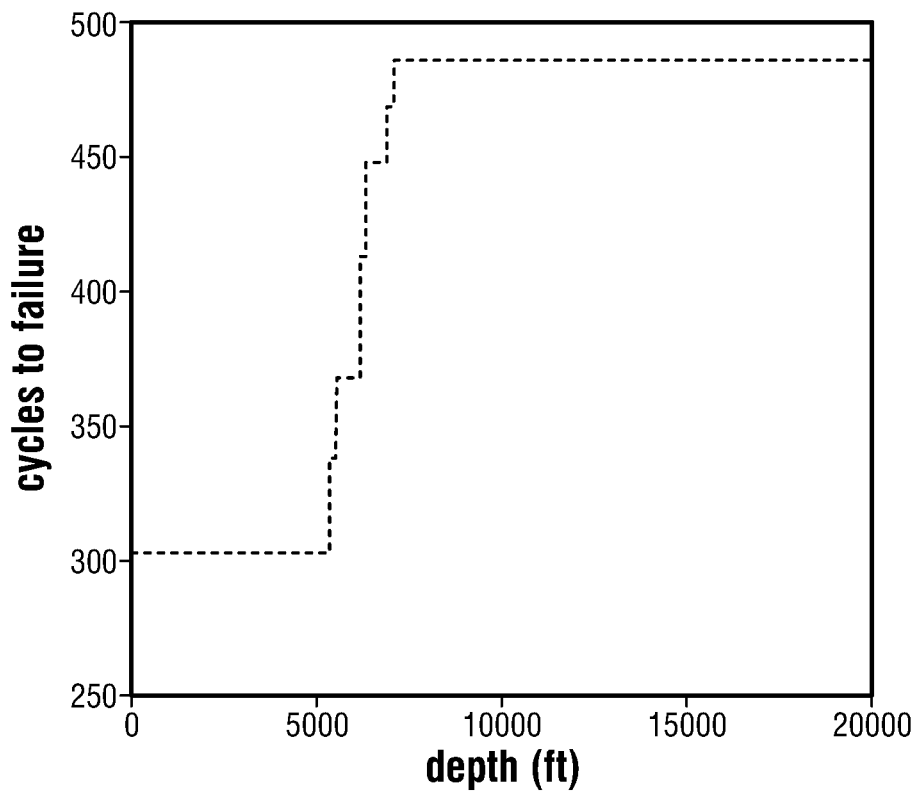
FIG. 5 is a graphical representation illustrating data regarding cycles to failure versus depth of the pipe, according to an embodiment of the disclosure.

By combining fatigue life data with anomaly data, e.g. data regarding changes in fatigue life due to different wall thicknesses, a more accurate estimation of the actual fatigue cycle limits may be provided. For example, test data on correlations between wall thickness and reduction in fatigue life as well as the cycles to failure may be stored in libraries 48, 50. An example of such data is illustrated graphically in FIG. 5. In the example represented in FIG. 5, historical test data for the same type of tapered coiled tubing 22 is plotted to provide cycles to failure versus depth in a common operating scenario, e.g. operating the tapered coiled tubing 22 with 3000 pounds per square inch differential pressure and subjecting the coiled tubing to a 72 inch bending radius. As indicated by this data, the cycles to failure for the thick walled end is greater than the cycles to failure for the thin walled end under the same common bending radius and differential pressure. This indicates the thick walled end may be able to sustain many more fatigue cycles than the thin walled end. This type of historical test data may be collected in library 42 and used by software module 40 to provide an accurate estimate of the cycles to failure. The estimate may be output to the computer display or other output device 38.

Figure 6:
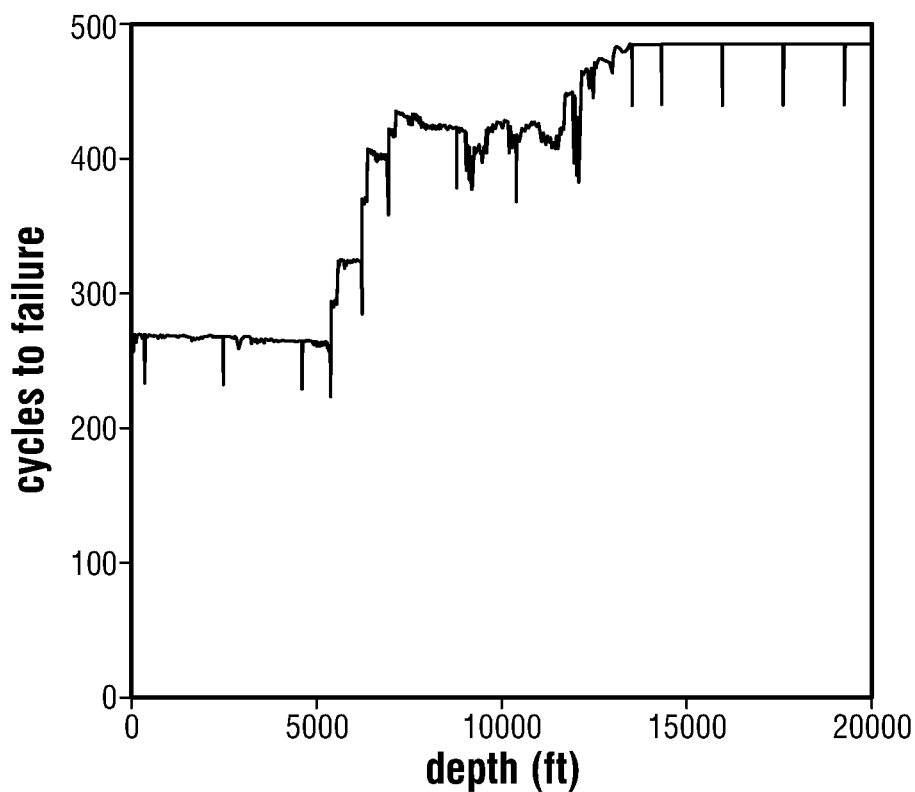
FIG. 6 is another graphical representation illustrating data regarding cycles to failure versus depth of the pipe, according to an embodiment of the disclosure.

In FIG. 6, results of employing the methodology for estimating cycles to failure are illustrated. The results showing cycles to failure in FIG. 6 are calculated by initially determining an existing level of consumed fatigue life for a given tubing 22, as represented in FIG. 3. Referring again to FIG. 6, it should be noted that the first approximately 5000 feet of coiled tubing 22 on the downhole end may be more susceptible to failure as indicated by the much lower number of remaining cycles to failure. Such improved information is not available from methods of coiled tubing fatigue tracking relying solely on the consumed fatigue life data of coiled tubing without anomalies (see data represented in FIG. 3).

The anomalies 28 which effectively change the fatigue life of the tubing 22 may be in many different forms. By way of example, the coiled tubing 22 or other pipe may be exposed to anomalies in the form of damaging factors, such as mechanical defects, corrosion, and/or bending-straightening cycles. These damaging factors may lead to localized metal loss which can reduce the life expectancy of the coiled tubing 22. The sensor devices 24, e.g. magnetic flux leakage inspection devices, can be used to reliably detect such localized defects. The correlation library 48 may comprise various correlations, e.g. scaling correlations, between the MFL signals and percentage fatigue life reduction. By using such correlations in the methodology described herein, e.g. by combining such correlations with data from the cycles to failure library 50, the reduction in cycles to failure due to the localized effects may be accurately evaluated and output to the desired output device 38.

Figure 7:
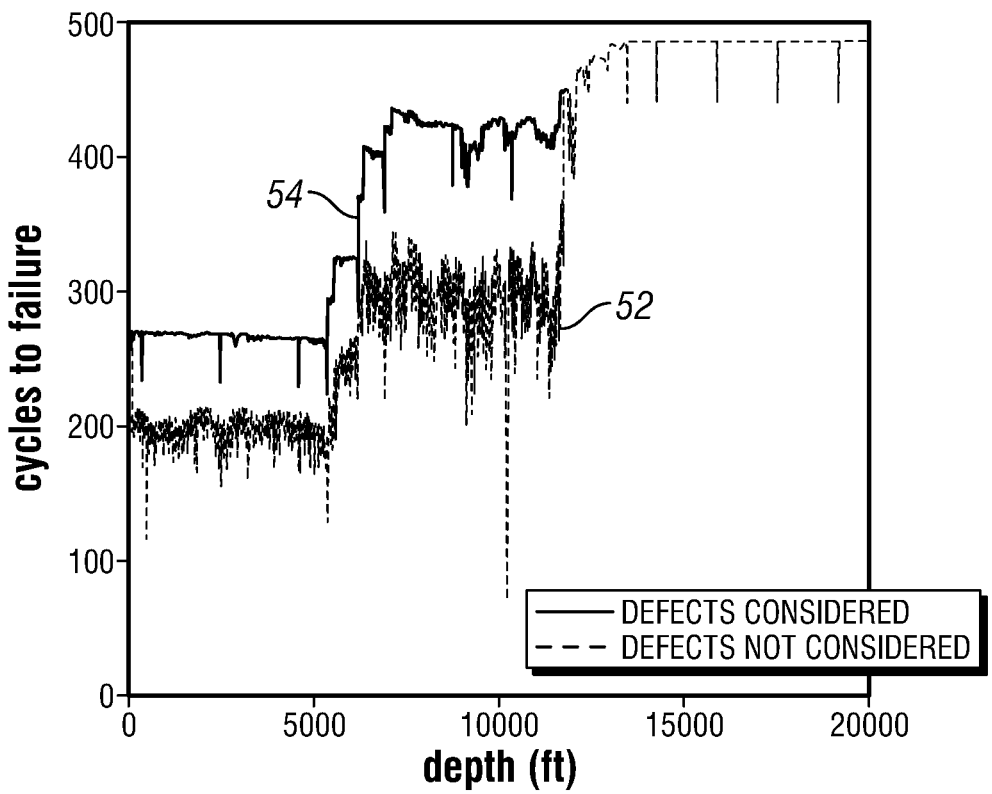
FIG. 7 is another graphical representation illustrating data regarding cycles to failure versus depth of the pipe, according to an embodiment of the disclosure.

By using software module 40 to process the combined data from libraries 44, 46, 48, 50, a more precise estimation of cycles to failure may be provided as compared to using solely the data related to fatigue life of pipe without anomalies 28. In FIG. 7, data is provided graphically via plots 52, 54 in the form of plot 54 of depth versus cycles to failure for coiled tubing 22 in which defects/anomalies 28 are not considered. The figure also contains plot 52 illustrating an improved prediction of cycles to failure versus depth for coiled tubing 22 in which the defect/anomalies 28 are considered. For this example, it should be noted the coiled tubing 22 at around 10,000 feet may be more susceptible to failure. In this case, the increased susceptibility to failure is due to a group of mechanical defects 28 which reduces the expected number of cycles to failure.

Figure 8:
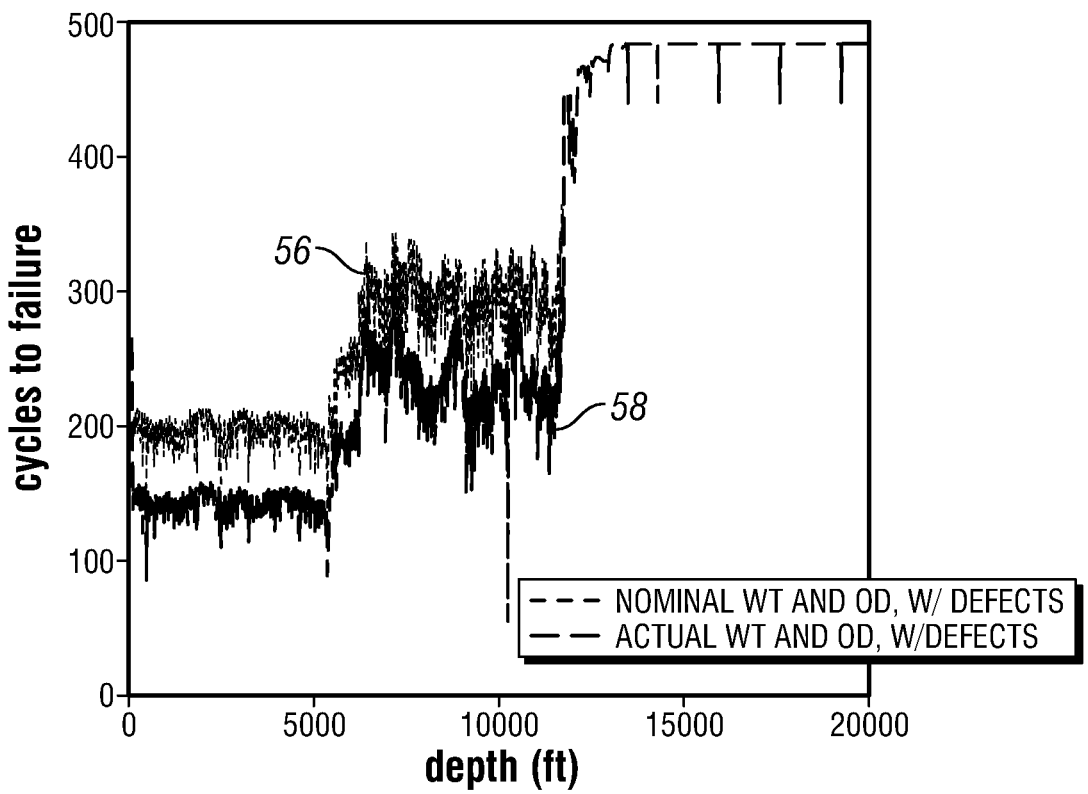
FIG. 8 is another graphical representation illustrating data regarding cycles to failure versus depth of the pipe, according to an embodiment of the disclosure.

In addition to localized defects, other anomalies 28 may lead to a reduction in coiled tubing fatigue resistance. Such anomalies 28 may include wall thinning due to acid exposure, abrasion, or other factors. The anomalies 28 also may include ballooning of the coiled tubing 22 due to cyclic operations under high pressure. By using the MFL devices 24 or other suitable sensors, the occurrence of such anomalies or changes in such anomalies may be monitored in real time. For example, the MFL sensors 24 may be used to provide real-time, accurate monitoring of wall thicknesses and diameter measurements so that the impact of wall thinning and diameter ballooning may be added to the anomaly library 46 so as to facilitate predictions of cycles to failure. FIG. 8 provides an example in which the results are graphically illustrated. In this example, a first plot 56 illustrates the results when the nominal values of wall thickness and coiled tubing diameter are used, and a second plot 58 corresponds with results when the actual measured values of wall thicknesses and diameter are used. By using the MFL sensors 24 to track the anomalies 28, e.g. wall thinning and/or ballooning, improved prediction of cycles to failure may be achieved as illustrated graphically.

The software module 40 may comprise various models or algorithms for utilizing the data collected and stored in library 42. For example, the software module 40 may comprise a data matching algorithm which matches the appropriate historical data from sub libraries 44, 46, 48 and 50. In some embodiments, the software module 40 may incorporate fatigue life thresholds and trips-to-failure modeling. These various techniques may be used to provide cycles to failure assessments for direct evaluation of fitness for service with respect to a given coiled tubing or other type of pipe 22.

Initial fatigue life assessment may be determined and stored in library 42 according to established models for fatigue life tracking which consider loading history, e.g. pressure and bending radius, and tubing properties, e.g. diameter, wall thickness, and material grade. As described above, the consumed fatigue life theoretically reaches 100% before failure occurs but in real world operations the failure often occurs prior to reaching the 100% fatigue life due to anomalies 28. The methodologies described herein may be used to provide a rigorous and accurate way of setting fatigue life threshold values which account for the effects of anomalies 28, e.g. localized defects.

According to an embodiment, a methodology for setting accurate threshold values for fatigue life is based on non-destructive evaluation of the pipe/coiled tubing 22. As described above, magnetic flux leakage sensors 24 may be used to obtain measurements for use in a non-destructive evaluation method based on established quantitative relationships between MFL measurements and a fatigue life ratio of specific defects 28. This fatigue life ratio may be defined as the fraction of total cycles to failure when a defect exists compared to when the defect does not exist. By using this quantitative correlation (which may be stored in correlation library 48), the threshold value of fatigue life may be determined at the place of localized defects.

Figure 9:
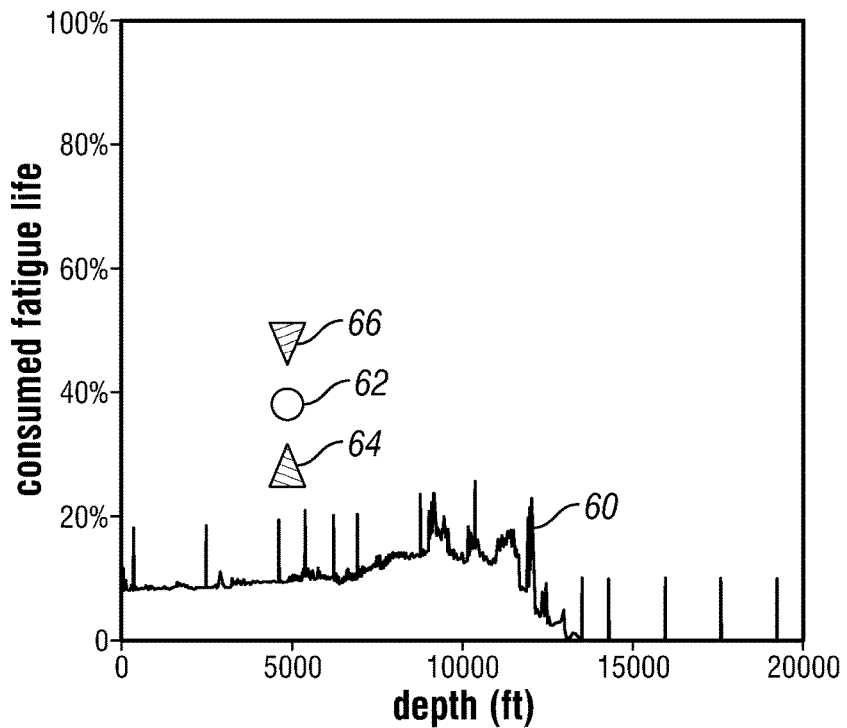
FIG. 9 is a graphical representation illustrating data regarding consumed fatigue life versus depth of the pipe, according to an embodiment of the disclosure.

An example of the effects of the localized defect 28 is illustrated graphically in FIG. 9. In the illustrated graph, the graph line 60 indicates the consumed fatigue life versus depth during deployment of coiled tubing 22 without defects 28. By way of example, the fatigue life for a given defect-free pipe/coiled tubing 22 may be stored in fatigue life library 44. A dot 62 represents a threshold value that the fatigue life should not exceed at a depth of around 5000 feet where a localized defect 28 exists. It should be noted this threshold value is much lower than 100% due to the detrimental effects of localized defect 28 as determined by the stored correlation relationships between MFL measurements and fatigue life ratio in module 40. In addition, it should be noted the value for dot 62 is determined based on the known information regarding the time when the localized defect 28 occurred. If the timing of the occurrence of defect 28 is unknown, then a range of values may be similarly determined for the fatigue life thresholds, as described immediately below, including worst-case and best-case scenarios.

In this graphical example, a worst-case scenario has been indicated by a triangle 64 which corresponds to the case where the defect 28 exists from the very beginning. A best-case scenario is indicated by a triangle 66 which corresponds to the case in which the defect 28 occurred very recently. The interval of threshold values between triangles 64 and 66 is based on the fact that the timing of the defect occurrence plays a role in the severity of the effects that result from the defect 28 with respect to coiled tubing fatigue. The earlier the defect 28 occurs, the more impact it has on the life of the coiled tubing 22. Accordingly, the limits of coiled tubing fatigue life may be determined via quantitative evaluation of defect severity based on magnetic flux leakage measurements. In reality, the time when a defect 28 occurs is in general between the very beginning and the very recent job. Thus, the threshold value is in general between the worst-case and the best-case scenarios, as indicated by dot 62, which is between triangle 64 and triangle 66. In some embodiments, the methodology may be implemented via an answer product software package embodied in software module 40 as described in the examples set forth below. The data collected from such testing also may be used in libraries 44, 46, 48, 50 to improve the quality of the historical data and thus the predictive results.

According to a first example, a coiled tubing string was evaluated with the following details:

| | |
|---|---|
| OD | 2.375 in |
| Material grade | 90-ksi |
| Wall Thickness | Tapered: |

|                    |                              |
|--------------------|------------------------------|
|                    | 0.175 in                     |
|                    | 0.190 in                     |
|                    | 0.204 in                     |
|                    | 0.224 in                     |
| Milling Date       | May, 2015                    |
| In-Service Date    | February, 2016               |
| End of Service Date| September, 2016              |
| Total Running Feet | 783,748 ft with 49 BHAs      |
| Working Drum       | Core Diameter: 96 in         |
|                    | Width: 87 in                 |
| Gooseneck Radius   | 120 in                       |
| Operation Type     | Coiled Tubing Drilling (CTD) |

During the first run-in-hole, the non-destructive evaluation tracking system 20 did not detect an anomaly/defect 28. However, when the coiled tubing string was pulled out of the borehole, three defects 28 were detected respectively near 14,000 feet, 12,000 feet, and 10,000 feet. The defect 28 at 12,000 feet was the defect having the greatest impact. In this particular example, the defect at 12,000 feet was a gouge type defect caused by injector head chain slippage during the first run in hole operation.

To evaluate the severity of this particular defect 28, the software module 40 was used to employ an answer product software. Based on the processing of data, evaluation results were output via, for example, output device 38 as indicated graphically in FIG. 10. In this example, the accumulated baseline fatigue life at the time defect 28 occurred is illustrated by graph line 68. Because the defects 28 occurred while running in hole during the very first run, the baseline fatigue life is near zero except at bias weld locations where fatigue reduction has been applied as illustrated. The impact of the defect 28 on fatigue life was considered by the answer product software of software module 40 and the calculated impact of defect 28 resulted in a dropping of the fatigue life threshold. For this case, the fatigue life threshold is dropped to 40% from the 100% theoretical limit, as represented by the dot 70 indicated at a depth near 12,000 feet. The gap between the graph line 68 and the dot 70 represents the amount of remaining fatigue that can be safely consumed without failure of the coiled tubing 22 at this particular defect 28.

Figure 11:
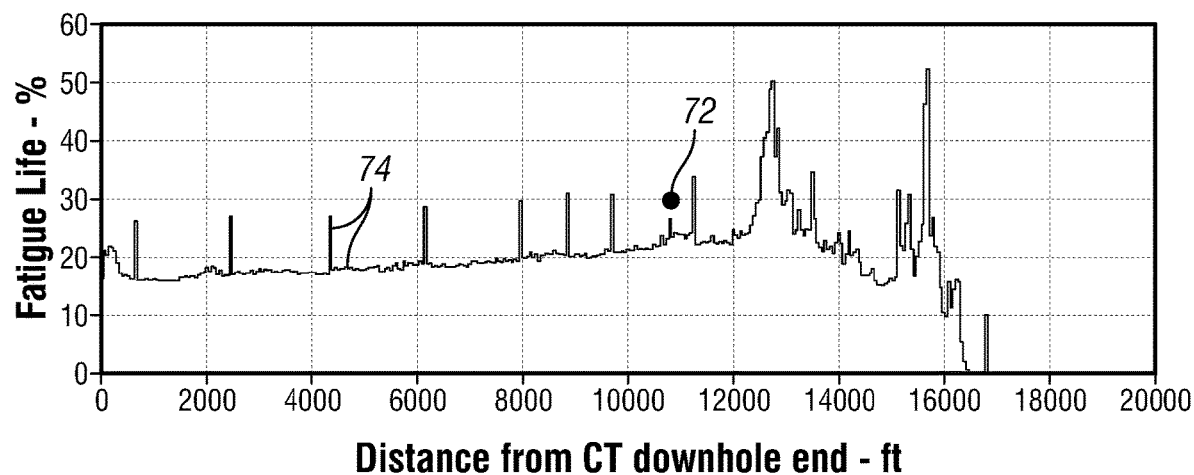
FIG. 11 is another graphical representation illustrating data regarding fatigue life versus depth of the pipe, according to an embodiment of the disclosure.

The answer product software of software module 40 also may be used to track the evolution of specific defects 28, e.g. the defect 28 at a depth near 12,000 feet. In this example, the condition of this particular defect 28 has deteriorated after six months of service in the field. Due to defect deterioration, the quantitative fatigue life threshold is dropped further to about 30% of the previous 40% threshold, as represented by the dot 72 in the graphical illustration of FIG. 11. It should be noted the defect 28 is now located at the depth near 10,800 feet and this is mainly due to coil trimming during deployment.

Figure 10:
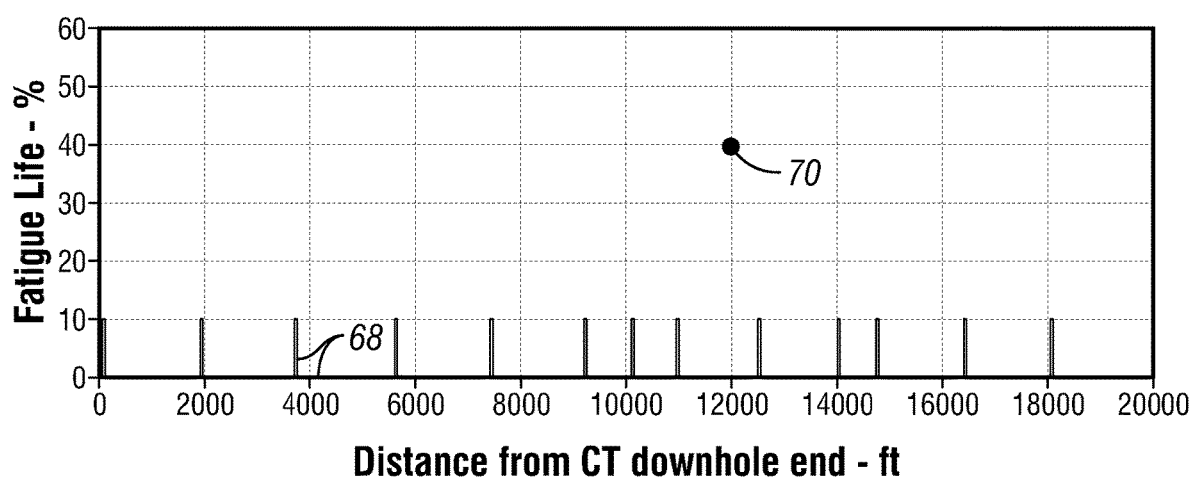
FIG. 10 is another graphical representation illustrating data regarding fatigue life versus depth of the pipe, according to an embodiment of the disclosure.

Additionally, the baseline fatigue as represented by graph line 74 has grown due to field use compared to line 68 in FIG. 10. As illustrated, there is still a gap between the graph line 74 and the dot 72 in FIG. 11, but the gap has reduced substantially as compared to the gap in FIG. 10. This means the coiled tubing 22 is still suitable for a few additional jobs without failing at this particular defect 28 although the coiled tubing 22 should be continually monitored by the non-destructive evaluation tracking system 20. This case study demonstrates it is feasible to safely extend the useful life of coiled tubing strings even with the presence of a defect, e.g. damage, by using the continued monitoring, inspection, and evaluation of the coiled tubing string enabled by tracking system 20.

According to a second example, a coiled tubing string was evaluated with the following details:

|                    |                              |
|--------------------|------------------------------|
| OD                 | 2.375 in                     |
| Material grade     | 90-ksi                       |
| Wall Thickness     | Tapered:                     |
|                    | 0.156 in                     |
|                    | 0.175 in                     |
|                    | 0.190 in                     |
|                    | 0.204 in                     |
| Working Drum       | Core Diameter: 115 in        |
|                    | Width: 96 in                 |
| Gooseneck Radius   | 100 in                       |
| Operation Type     | Coiled Tubing Drilling (CTD) |

Figure 12:
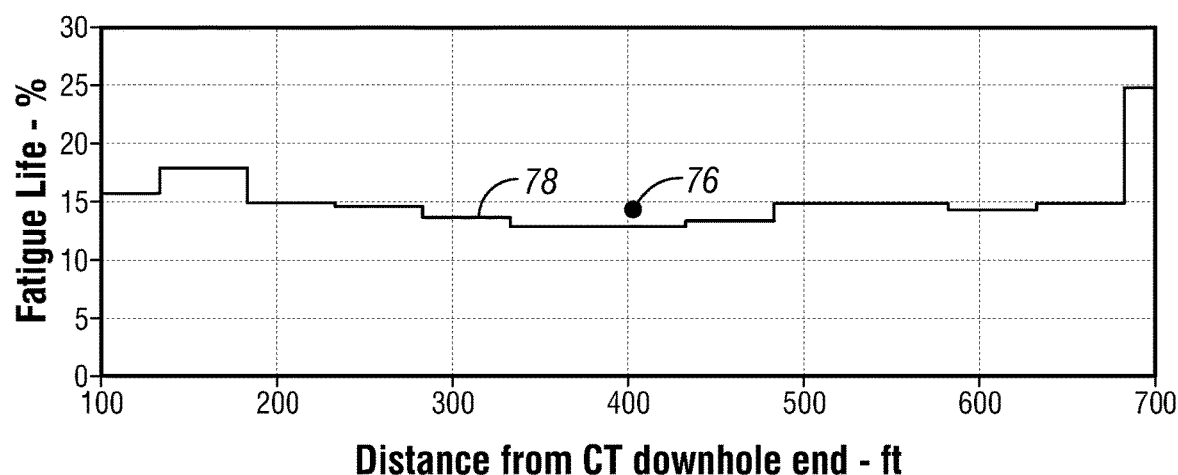
FIG. 12 is another graphical representation illustrating data regarding fatigue life versus depth of the pipe, according to an embodiment of the disclosure.

In this example, the answer product software of software module 40 was again used to evaluate the impact of a physical defect 28 on the coiled tubing string 22. Results are shown in FIG. 12. It should be noted the test results were achieved at a pressure level of 3000 psi and a gooseneck radius of 100 inches for deployment of the coiled tubing 22. Because of this particular defect 28, the fatigue life threshold was reduced to within 15% for the depth where the defect 28 was located (see dot 76). Because the baseline fatigue life at that particular depth has already exceeded 13% (see graph line 78), the coiled tubing string 22 was predicted to fail within two typical jobs.

According to a third example, a coiled tubing string was evaluated with the following details:

|                    |                              |
|--------------------|------------------------------|
| OD                 | 2.375 in                     |
| Material grade     | 90-ksi                       |
| Wall Thickness     | Tapered:                     |
|                    | 0.175 in                     |
|                    | 0.190 in                     |
|                    | 0.204 in                     |
|                    | 0.224 in                     |
| Milling Date       | May, 2015                    |
| In-Service Date    | January, 2016                |
| End of Service Date| July, 2016                   |
| Total Running Feet | 855,691 ft with 58 BHAs      |
| Working Drum       | Core Diameter: 96 in         |
|                    | Width: 87 in                 |
| Gooseneck Radius   | 120 in                       |

Figure 13:
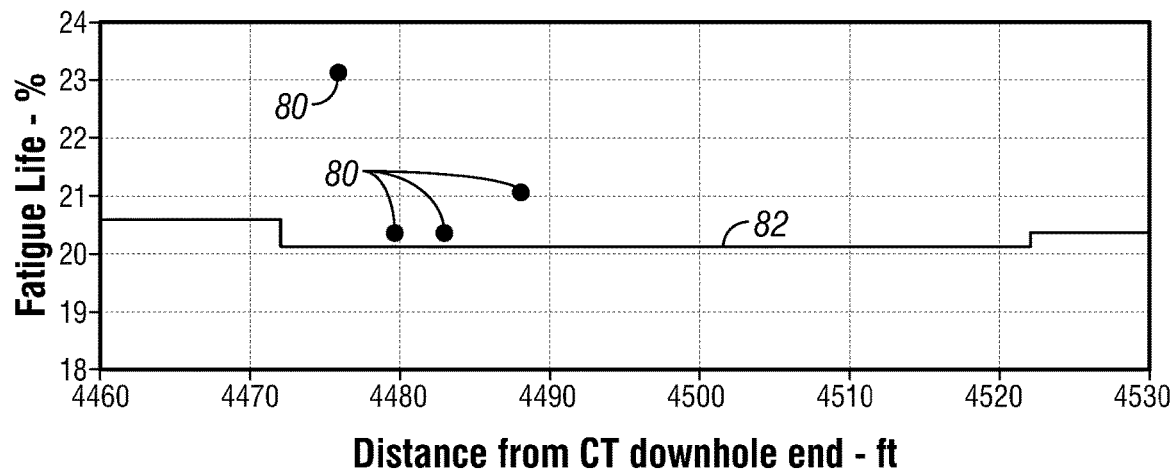
FIG. 13 is another graphical representation illustrating data regarding fatigue life versus depth of the pipe, according to an embodiment of the disclosure.

In this example, a group of groove/necking type defects 28 were identified at a later stage and tracked via MFL sensors 24 of tracking system 20. The software module 40, e.g. answer product software, of processing system 30 was used by the non-destructive evaluation tracking system 20 to quantify the impact of such defect 20 on the integrity of the coiled tubing 22. The system 20 output results to output device 38 and those results are illustrated graphically in FIG. 13.

It should be noted the test results were obtained while subjecting the coiled tubing 22 to a pressure level of 3000 psi and a gooseneck radius of 120 inches. The results indicate a reduced fatigue life threshold, as represented by dots 80, which is fairly close to the existing baseline fatigue life indicated by graph line 82. These results indicate the coiled tubing 22 is near the end of its useful life. Consequently, appropriate decisions may be made such as withdrawal of the coiled tubing from service based on the system evaluation results. The noninvasive tracking system 20 enables monitoring, inspection, and evaluation so as to enable withdrawal of the coiled tubing 22 before a costly failure occurs.

Figure 14:
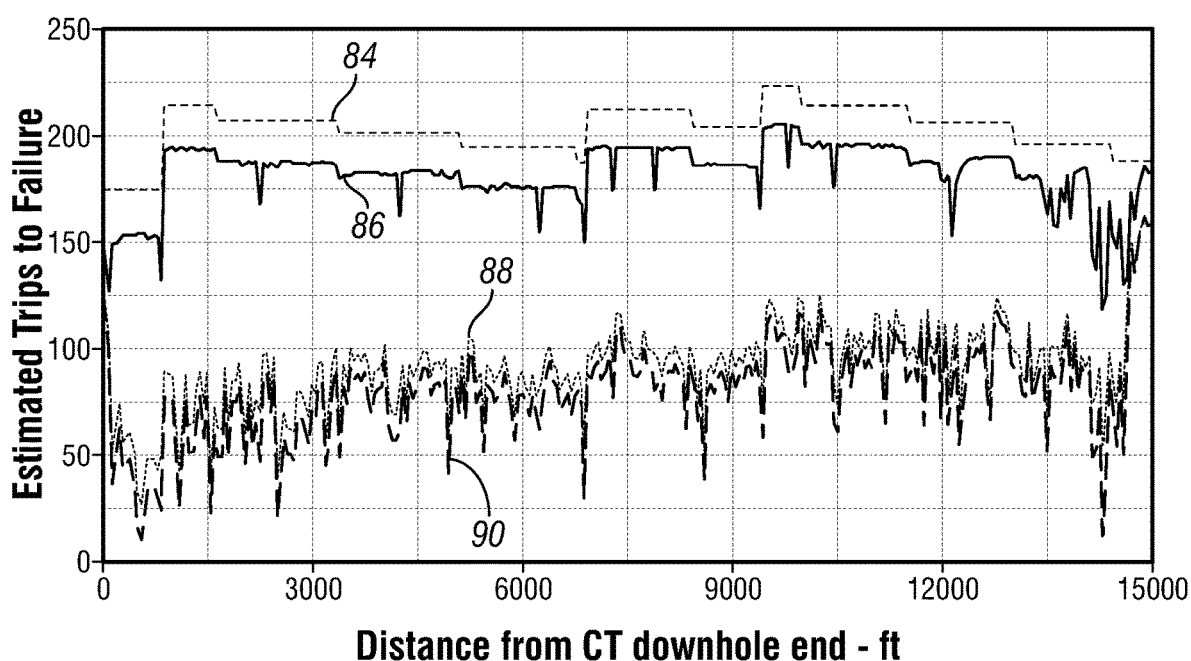
FIG. 14 is a graphical representation illustrating data regarding estimated trips to failure versus depth of the pipe, according to an embodiment of the disclosure.

In some embodiments, the software module 40 may be used to estimate cycles to failure based on modeling which assumes the coiled tubing 22 is fatigued against a constant bending radius. However, the coiled tubing 22 may go through varying bending radii depending on the depth of each section of the coiled tubing. For example, the closer the coiled tubing 22 is to the center of the drum/reel on which it is coiled, the smaller the bending radius. Additionally, for each complete trip downhole (as the coiled tubing is moved into and out of the service well), the coiled tubing goes through two complete bending cycles on the gooseneck and one complete cycle on the coiled tubing drum. Based on such facts, the model carried out by processing system 30 may be extended to provide cycles to failure estimates in the form of a quantitative estimation of trips to failure, as indicated graphically in FIG. 14.

Referring again to FIG. 14, different estimates of trips to failure are provided graphically for different scenarios and such results may be output to, for example, output device 38. In this example, a graph line 84 represents the model estimation of trips to failure based on new coiled tubing with 0% consumed fatigue life and without localized defects. Such estimation utilizes the fatigue life model built in system/module 40 and is based on the provided operating condition parameters, including the coiled tubing information (e.g. depth, diameter, wall thickness, grade), the corresponding reel geometries (e.g. inside reel diameters, reel width), coiled tubing gooseneck radius, and the typical circulating pressure level. A graph line 86 represents the model estimation of used coiled tubing considering accumulated fatigue life without the existence of localized anomalies, e.g. without localized defects. Such estimation is based on the information used to estimate graph line 84 plus the additional information of the existing/consumed fatigue value at each depth of the coiled tubing.

In this example, graph lines 88, 90 are utilized and graph line 90 represents the model estimation of used coiled tubing considering accumulated fatigue life and also considering the existence of localized damages, as detected and processed by system 30 for example. Such estimation utilizes the comprehensive information used to estimate graph line 86 plus the additional information of the MFL measurements by system 30 and the corresponding correlation libraries built into system/module 40 combined with the added assumption that the localized damages were in existence since approximately the time the coiled tubing string was first put into operation. Additionally, graph line 88 represents the model estimation of used coiled tubing considering accumulated fatigue life and also considering the existence of localized damages as detected and processed by system 30 for example. Such estimation utilizes the comprehensive information used to estimate graph line 86, plus additional information of the MFL measurements by system 30 and the corresponding correlation libraries built into system/module 40 combined with the added assumption that the localized damages have occurred on the most recent job. Thus, the tracking and evaluation system 20 may be used to output useful results to an operator so that decisions may be made with respect to continued use of the coiled tubing 22 (or other type of pipe) given various scenarios including the timing of defect occurrence.

By using processing system 30 to process data regarding anomaly type, the fatigue life accumulation data for the pipe 22, and the number of cycles experienced by the pipe 22 at the time the defect, accurate estimates of the cycles to failure and/or trips to failure can be provided. In some applications, additional data (e.g. depth of defect 28 during usage, pressure and/or bending radius experienced by pipe 22 at the defect 28, wall thickness) can be useful in further enhancing the estimates. The estimates of remaining cycles/trips can be output to, for example, output device 38 for use in determining an appropriate remedial action, such as withdrawal of the pipe, repair of the pipe, or the number of additional operations before such action. As described above, the processing system 30 may further be used in processing data for estimating a threshold value to set a limit for the fatigue life value that should not be exceeded so as to safeguard operations based on defect severity estimation and timing information with respect to defect occurrence.

The process of estimating may comprise estimating a worst-case threshold value assuming the existence of defects since the very beginning of tubing utilization. Additionally, the process may comprise estimating a best-case threshold value assuming defects occurred very recently. The process also may comprise estimating a worst-case number of trips to failure assuming the presence of defects from the very beginning. Also, the process may comprise estimating the best-case number of trips to failure assuming defects occurred very recently.

The system and methodologies described herein may be employed in non-well related applications which utilize evaluation of coiled tubing, jointed pipe, and/or other tubing strings. Additionally, processes may employ a variety of sensors, data processing systems, and/or software modules for evaluating sensor data and/or making recommendations. The system may be automated to implement automatic changes to a tubing string operation based on defect data detected and evaluated. In some applications, the operational changes can be made in real time. Additionally, various types of storage databases/libraries may be constructed to accumulate many types of correlations and defect data. By way of example, the library 42 may comprise a defect library which may be automatically updated with defect entries based on defects 28 detected during evaluation of pipes, e.g. coiled tubing. Also, elements of the overall processes described herein may be performed at a variety of times and in various orders during implementation of the processes.

Although a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for tracking and assessing a coiled tubing string, comprising:
   determining a fatigue life of the coiled tubing string;
   utilizing a magnetic flux leakage (MFL) device to monitor the coiled tubing string;
   upon detecting a defect in the coiled tubing string via the MFL device, processing defect data in combination with data on the fatigue life to determine a new fatigue life of the coiled tubing string with the detected defect; and
   using the new fatigue life to output an estimate of cycles to failure of the coiled tubing string, wherein using comprises estimating a worst-case number of trips to failure assuming the defect existed since the beginning of use of the coiled tubing.

2. The method as recited in claim 1, wherein processing defect data comprises utilizing the type of defect detected as a factor in determining the new fatigue life.

3. The method as recited in claim 1, wherein utilizing comprises utilizing the MFL device to monitor the coiled tubing string along different nominal wall thicknesses.

4. The method as recited in claim 3, wherein using comprises outputting the estimate of cycles to failure for sections of the coiled tubing string along the entire length of the tapered coiled tubing string.

5. The method as recited in claim 1, wherein processing comprises using a software module to select historical data used in determining the new fatigue life.

6. The method as recited in claim 1, wherein using comprises outputting an estimate of remaining trips downhole until failure.

7. The method as recited in claim 1, wherein processing comprises employing a correlation library.

8. The method as recited in claim 1, wherein using comprises estimating a threshold value to set a limit for the fatigue life value that should not be exceeded so as to safeguard operations based on defect severity estimation and timing information with respect to defect occurrence.

9. The method as recited in claim 8, wherein estimating the threshold value comprises estimating a worst-case threshold value assuming the defect existed since the beginning of the use of the coiled tubing string.

10. The method as recited in claim 8, wherein estimating the threshold value comprises estimating a best-case threshold value assuming a recent occurrence of the defect.

11. The method as recited in claim 1, wherein using comprises estimating a best-case number of trips to failure assuming a recent occurrence of the defect.

12. A method, comprising:
monitoring coiled tubing to detect the presence of an anomaly in the coiled tubing;
providing data regarding the anomaly to a data processing system for comparison to stored historical data;
estimating a worst-case threshold value assuming the anomaly existed since the beginning of use of the coiled tubing;
establishing a fatigue life of the coiled tubing without the anomaly;
determining the number of cycles experienced by the coiled tubing at the time the anomaly occurred;
using combined data on the fatigue life, the type of anomaly, and the number of cycles experienced by the coiled tubing at the time the anomaly occurred to estimate a new fatigue life as well as a worst-case scenario based on the worst-case threshold value; and
based on the new fatigue life, determining and outputting an estimate of the remaining number of cycles to failure to determine future use of the coiled tubing.

13. The method as recited in claim 12, further comprising continuing to use the coiled tubing a predetermined number of cycles based on the estimate.

14. The method as recited in claim 12, wherein using comprises using at least one MFL sensor to track magnetic flux leakage signals and to detect changes in the magnetic flux leakage signals indicative of the anomaly.

15. The method as recited in claim 12, wherein providing data to the data processing system comprises using magnetic flux leakage signatures to provide data on a type of defect.

16. The method as recited in claim 12, wherein using the combined data comprises using data on borehole depth of the anomaly during use of the coiled tubing and using data on the pressure experienced by a section of the coiled tubing having the anomaly during use of the coiled tubing.

17. A system for estimating tubing life, comprising:
a sensor positioned along a pipe to monitor for a magnetic flux leakage signal associated with an anomaly in the pipe; and
a data processing system which obtains data from the sensor, the data processing system comprising:
a display;
a memory in which historical anomaly data is stored regarding the type of anomaly, the memory also storing fatigue life data regarding fatigue life of the pipe without the anomaly; and
a processor which uses a computer model for combining data from the sensor, historical anomaly data, and fatigue life data to estimate a remaining number of cycles to failure of the pipe as well as a range from worst-case to best-case scenarios.

18. The system as recited in claim 17, wherein the processor also utilizes data on borehole depth of the anomaly during use of the pipe to estimate the remaining number of cycles to failure.

19. The system as recited in claim 18, wherein the computer model is used to output an estimate of trips downhole until failure.

* * * * *